(12) United States Patent
Marroquin et al.

(10) Patent No.: US 7,262,958 B2
(45) Date of Patent: Aug. 28, 2007

(54) APPARATUS AND METHOD FOR SECURING A COMPONENT IN AN INFORMATION HANDLING SYSTEM

(75) Inventors: Marco A. Marroquin, Pflugerville, TX (US); James Don Curlee, Round Rock, TX (US); John D. Revell, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 87 days.

(21) Appl. No.: 11/140,685

(22) Filed: May 31, 2005

(65) Prior Publication Data

US 2006/0268509 A1 Nov. 30, 2006

(51) Int. Cl.
*G06F 1/16* (2006.01)

(52) U.S. Cl. .................. 361/685; 361/679; 361/683; 312/223.2; 312/223.3

(58) Field of Classification Search ................ 361/683, 361/679, 685, 724–727, 740; 312/223.1, 312/223.2, 223.3, 205, 330.1, 332.1, 333; 248/500, 505–510, 222.12, 222.11
See application file for complete search history.

(56) References Cited

U.S. PATENT DOCUMENTS

| 4,713,714 | A | * | 12/1987 | Gatti et al. | 360/137 |
|---|---|---|---|---|---|
| 5,680,293 | A | * | 10/1997 | McAnally et al. | 361/685 |
| 5,943,208 | A | * | 8/1999 | Kato et al. | 361/685 |
| 6,262,883 | B1 | * | 7/2001 | Kim | 361/680 |
| 6,467,858 | B1 | * | 10/2002 | Le et al. | 312/223.2 |
| 2005/0168932 | A1 | * | 8/2005 | Selvidge et al. | 361/685 |

* cited by examiner

*Primary Examiner*—Michael Datskovskiy
(74) *Attorney, Agent, or Firm*—Haynes and Boone, LLP (57) ABSTRACT

An apparatus for securing a component to a chassis in an information handling system. The apparatus has a first interface configured to couple with the component, and a second interface configured to couple with the chassis. One of the first interface and the component includes a first elastically biasable member configured to engage a first engagement feature of the other of the first interface and the component. One of the second interface and the chassis comprises a second elastically biasable member configured to engage a second engagement feature of the other of the second interface and the chassis.

16 Claims, 6 Drawing Sheets

APPARATUS AND METHOD FOR SECURING A COMPONENT IN AN INFORMATION HANDLING SYSTEM

BACKGROUND

The present disclosure relates generally to information handling systems, and more particularly to integrated CPU heat sink retention and hard drive mounting apparatus.

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

There exists a number of industry standard form factors regarding the layout of components within an information handling systems chassis. One example is the Balanced Technology Extended (BTX) form factor. However, current systems complying with these form factors suffer many disadvantages, particularly with regard to the location and installation of hard drives and other mass storage devices, power supply modules, and thermal management modules, among others.

For example, current approaches to installation of mass storage devices within BTX and other form factors usually necessitate the use of machine- or hand-operated tools, making installation and removal of the mass storage devices inconvenient, and often complex. Current approaches also provide insufficient airflow proximate mass storage devices, resulting in poor thermal management. Mass storage devices are also susceptible to mechanical shock when conventionally located and installed, such as may be received during shipping and other handling of the information handling system during and after assembly. Moreover, current approaches require installation with threaded fasteners and other attachment means, where the fasteners extend through openings in the motherboard and/or other printed wiring assembly (PWA) of the information handling system. Consequently, these PWAs must be designed to accommodate such openings, making their design more complex, and consuming precious surface area thereon.

Accordingly, it would be desirable to provide apparatus and methods for securing a mass storage device, power supply module, thermal management module, and other components in an information handling system absent the disadvantages found in the prior methods discussed above.

SUMMARY

According to aspects of one embodiment, an information handling system includes a chassis, a heatsink assembly coupled to the chassis, a mass storage device, and a support structure coupled to the heatsink assembly and rotatably coupled to the chassis and configured to receive the mass storage device.

One advantage of embodiments incorporating one or more aspects of the present disclosure is that no tools may be required for the installation of the mass storage device or other component into the information handling system. Another advantage is that the mass storage device or other component may be aligned with existing thermal management solutions, such as the CPU thermal solution, thereby improving thermal management of the mass storage device. Moreover, such location may permit access to components/connectors of the underlying motherboard or other PWA, and can eliminate the need for additional holes in the motherboard or other PWA previously required to receive threaded fasteners or other attachment means.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

Figure 1:
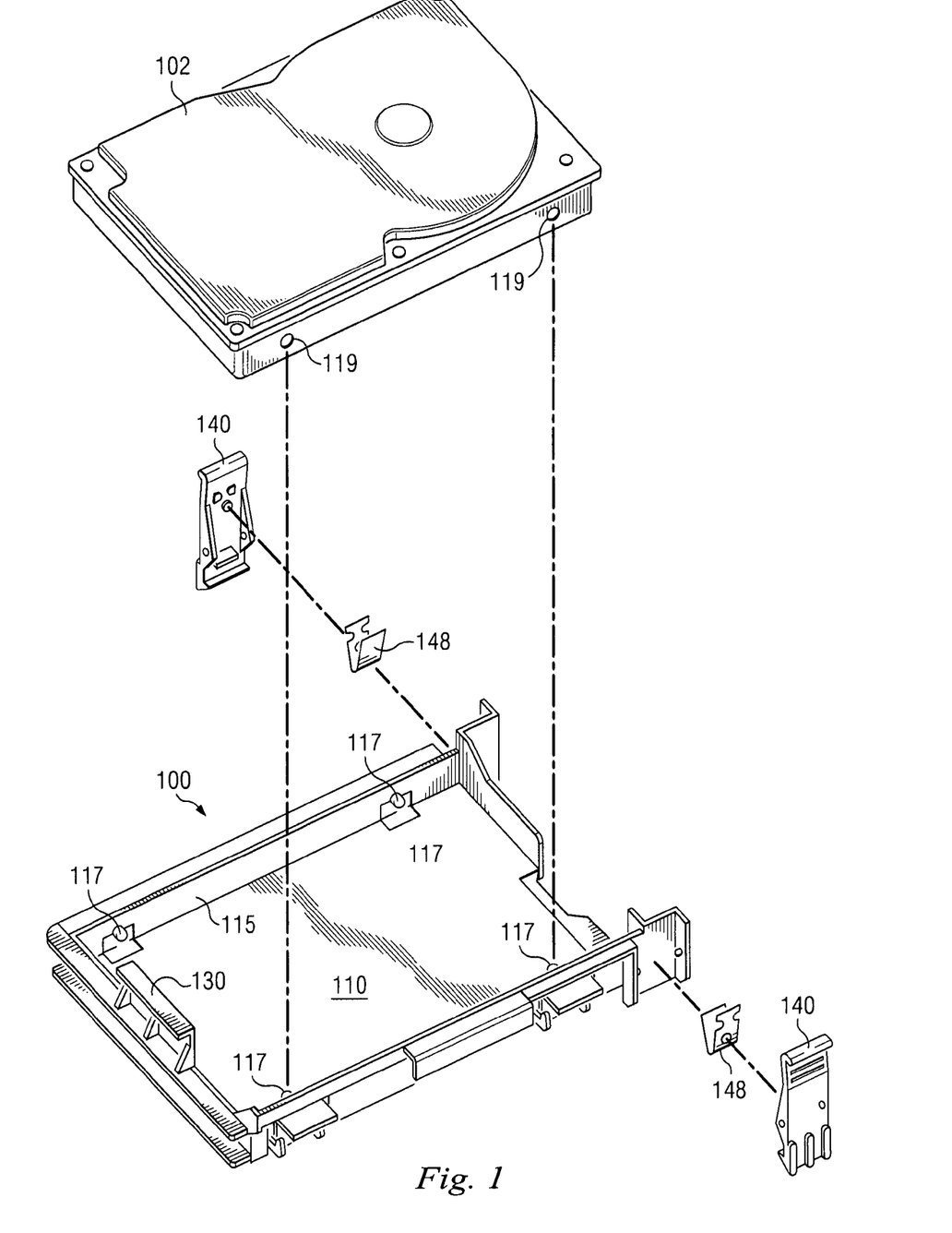
FIG. 1 is an exploded, perspective view of at least a portion of one embodiment of apparatus according to aspects of the present disclosure.

Referring to FIG. 1, illustrate is an exploded perspective view of at least a portion of one embodiment of an apparatus 100 for securing a disk drive or other component 102 to a chassis in an information handling system according to aspects of the present disclosure. The apparatus 100, or portions thereof, may be referred to herein as a cradle, support, member, support member, support structure, platform, panel, or body, among other terms.

At least a substantial portion of the apparatus 100, such as a main portion 110, may comprise a hard plastic, metal and/or other structural or substantially rigid material, and may be formed by machining, casting, injection molding and/or other manufacturing processes. In one embodiment, at least a portion of one or more surfaces of the main portion 110 may include a layer of rubber or dielectric material, such as may be employed for shock absorption and/or electrical isolation between the component 102 and the apparatus 100.

The main portion 110 of the apparatus 100 may have a footprint, profile or outline that substantially conforms to a footprint, profile, outline and/or other corresponding characteristic of the component 102. Thus, where the component 102 may have a substantially rectangular shape, the main portion 110 may have a similar, substantially rectangular shape, as in exemplary embodiments illustrated herein, although other shapes are also within the scope of the present disclosure.

The main portion 110 may be a substantially planar member primarily comprising a two-dimensional, sheet-like member. Alternatively, the main portion 110 or other portion of the apparatus may include raised walls 115 proximate the perimeter of the main portion 110. Thus, the main portion 110 may have a cupped or cradle configuration, such as in the embodiment depicted in FIG. 1. The walls 115 may be integral to the main portion 110, such as in embodiments in which the main portion 110 and walls 115 are formed simultaneously by, for example, injection molding. In other embodiments, the walls 115 (and/or other bosses, protrusions or other three-dimensional features) may be adhered or otherwise coupled to the main portion 110 or other portion of the apparatus 100.

The main portion 110 may include means for coupling the apparatus 100 with the component 102. Alternatively, or additionally, the raised walls 115 and/or another portion of the apparatus 100 may include such coupling means. In one embodiment, the means for coupling the apparatus 100 with the component 102 may comprise one or more protrusions extending from a wall 115 or other portion of the apparatus 100, where such protrusions may be configured to engage with a recess or opening 119 of the component 102. One such embodiment is depicted in FIG. 1, in which several such protrusions 117 extend from a wall 115 of the apparatus 100, and are configured to engage with corresponding recesses 119 of the component 102. In other embodiments, one or more protrusions may extend from the component 102 for engagement with a corresponding one or more recesses or openings in a wall 115 or other portion of the apparatus. In either case, the protrusions may be spring-loaded or otherwise biased and, thereby, configured to initially retract in response to contact with structure surrounding the corresponding recesses and subsequently extend into the recesses.

In other embodiments, one or more of the protrusions 117 may be elastic or otherwise biasable. For example, one such protrusion 117 may substantially comprise a plastic or metallic feature formed integrally with the main portion 110 and/or walls 115, and may have a sufficiently small cross-section as to allow elastic bending or compression to ultimately snap into a corresponding recess of the mating part. The protrusion 117 may alternatively or additionally comprise a spring-loaded ball or plunger device, such as those commonly referred to as spring plungers.

Of course, the scope of the present disclosure is not limited to embodiments that include the above-described means for coupling the apparatus 100 with the component 102. For example, other embodiments within the scope of the present disclosure may employ one or more other clips, latches, couplings, fasteners and/or other means, including those which are mechanical, magnetic, adhesive, and/or otherwise. Moreover, the coupling means described above may be configured to permanently couple the component 102 to the apparatus 100, but may alternatively be configured to detachably couple the component 102 and the apparatus 100.

The apparatus 100 also includes one or more interfaces for coupling with a chassis of an information handling system. In the embodiment shown in FIG. 1, such interfaces include a coupling member 130 and two coupling members 140. Of course, other embodiments within the scope of the present disclosure may include more than one coupling member 130, only one coupling member 140, and/or more than two coupling members 140. Moreover, means for coupling the apparatus with an information handling system chassis other than or in addition to the coupling members 130, 140 are also within the scope of the present disclosure.

Figure 2:
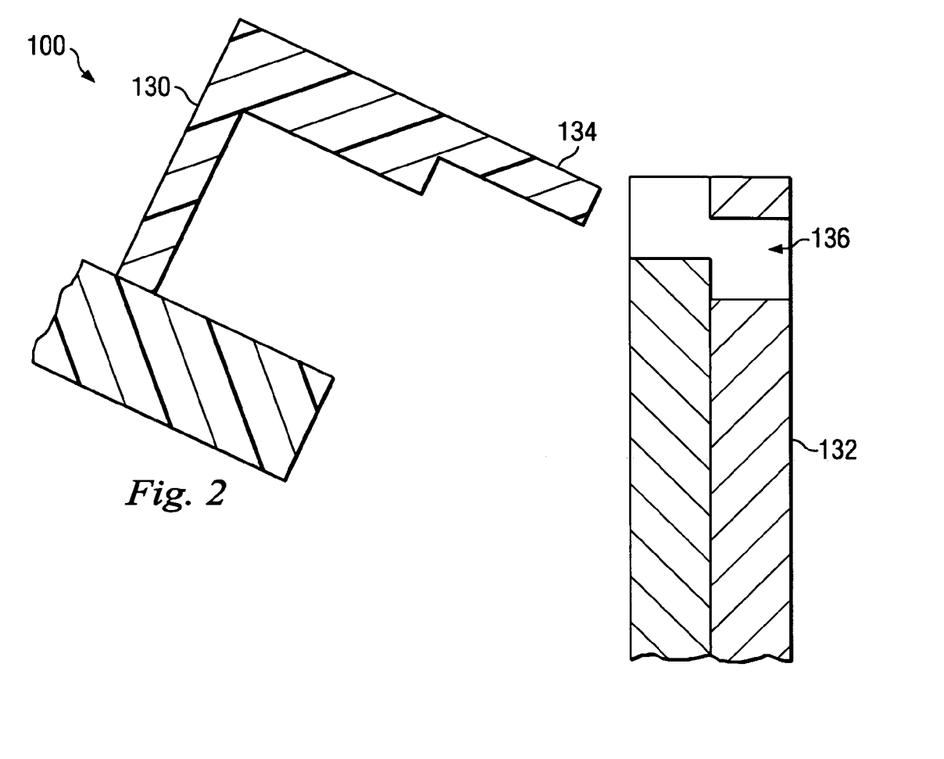
FIG. 2 is a sectional view of a portion of one embodiment of the apparatus shown in FIG. 1 in an intermediate stage of assembly according to aspects of the present disclosure.

Referring to FIG. 2, illustrated is a sectional view of at least a portion of the apparatus 100 shown in FIG. 1, including one embodiment of the coupling member 130 shown in FIG. 1 prior to being coupled with a chassis 132 of an information handling system. The coupling member 130 may be or comprise a protrusion extending from the main portion 110, a wall 115 and/or another portion of the apparatus 100. For example, a free end 134 of such a protrusion may be configured to mate with a recess or opening 136 of the chassis 132. As depicted in FIG. 2, attaching the apparatus 100 to the chassis 132 may entail rotating the apparatus 100 relative to the chassis 132 prior to inserting the end 134 of the coupling member 130 into the chassis opening 136. Thereafter, as depicted in FIG. 3, rotating the apparatus 100 back towards the chassis 132 may yield one or more point, line or surface contacts 138 between the coupling member 130 and the chassis 132.

Figure 3:
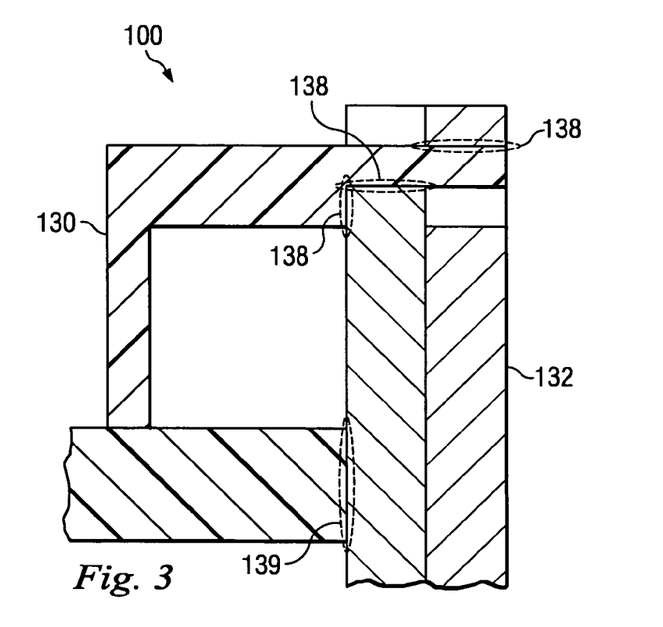
FIG. 3 is a sectional view of the apparatus shown in FIG. 2 in a subsequent stage of assembly.

The main portion 110 and/or other portion of the apparatus 100 may also be configured to contact the chassis 132 as a result of such rotation, such as the contact 139 referenced in FIG. 3. In one embodiment, the contacts 138/139 established between the coupling member 130 and the chassis 132 may include at least one contact discouraging movement of the apparatus 100 in a first direction relative to the chassis 132, and at least one contact discouraging movement of the apparatus 100 in a second direction relative to the chassis 132, where the first and second directions may be substantially perpendicular. The contacts 138/139 may also include at least one contact discouraging movement of the apparatus 100 in a third direction relative to the chassis 132, where the third direction is substantially perpendicular to the first and second directions.

Of course, the scope of the present disclosure is not limited to embodiments in which the apparatus 100 interfaces with the chassis 132 via the above-described coupling member 130. That is, alternative or additional coupling means may also be employed to directly interface the apparatus 100 with the chassis 132, such as where the junction or coupling established by the coupling member 130 and the chassis 132 is or includes a ball and socket arrangement, a hook and pin arrangement, and/or a dovetailed configuration, among others.

Figure 4:
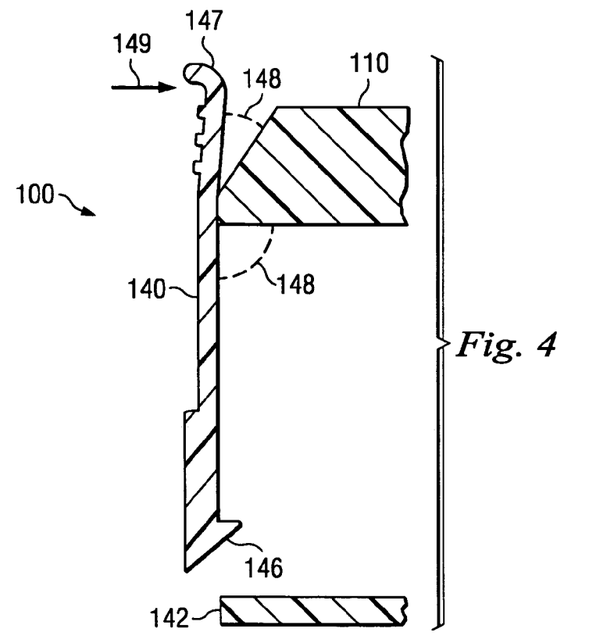
FIG. 4 is a sectional view of at portion of one embodiment of the apparatus shown in FIG. 1 in an intermediate stage of assembly according to aspects of the present disclosure.

Referring to FIG. 4, illustrated is a sectional view of at least a portion of the apparatus 100 shown in FIG. 1, including one embodiment of the coupling member 140 shown in FIG. 1 prior to being coupled with a mating component 142 of an information handling system. The mating component 142 may be substantially similar to the component 102 shown in FIG. 1, or to a feature thereof, such as those described below.

The coupling member 140 may be or comprise a biasable, latching member coupled to the main portion 110, a wall 115 and/or another portion of the apparatus 100. For example, a free end of the coupling member 140 may include a barbed tip 146, and/or may otherwise be configured to latch, grip or engage a lip, edge or surface of the mating component 142.

Moreover, the coupling member 140 may be a quick-release connector, such that coupling the apparatus 100 and the mating component 142 via the coupling member 140 may be a substantially tool-less operation. For example, hand-operation of the coupling member 140 may bias or deflect the ends of the coupling member 140 a sufficient degree to allow the mating component 142 to travel past the tip 146, whereby the tip 146 and the mating component 142 may become engaged.

In one embodiment, the contact established between the coupling member 140 and the mating component 142 may include at least one contact discouraging movement of the apparatus 100 in a first direction relative to the mating component 142 (and, hence, to the chassis 132, when the mating component is fixed relative to the chassis 132). The coupling member 140 may similarly discourage movement of the apparatus 100 in a second direction relative to the mating component 142 when engaged with the coupling member 140, where the first and second directions may be substantially perpendicular, and possibly a third direction that is substantially perpendicular to the first and second directions.

The coupling member 140 may include one or more biasing elements 148 configured to urge the coupling member 140 towards an engaged orientation (e.g., the orientation depicted in FIG. 1 or 4). Each biasing element 148 may comprise one or more compression springs, tensions springs, leaf springs, torsion springs, and/or other biasable elements. In other embodiments, the coupling member 140 may partially or substantially comprise an elastic or pliable material, thereby integrating the function of the biasing elements 140. For example, an attachment member interposing the coupling member and the remainder of the apparatus 100 (e.g., the main portion 110) may comprise a plastic, metallic or other material and may have cross-sectional dimension of sufficiently small magnitude so as to allow the coupling member 140 to effectively pivot about the attachment member in response to contact between the coupling member end 146 and the mating component 142, and possibly in response to an urging force applied at the other coupling member end 147 (e.g., in the direction of arrow 149 in FIG. 4). Such urging force may be applied by hand, therefore not requiring any tools to actuate the coupling member 140.

Of course, the scope of the present disclosure is not limited to embodiments in which the apparatus 100 interfaces with the mating component 142 via the above-described coupling members 140. That is, alternative or additional coupling means may also be employed to directly interface the apparatus 100 with the mating component 142, such as where the junction or coupling established by the coupling member 140 and the mating component 142 is or includes a ball and socket arrangement, a hook and pin arrangement, and/or a dovetailed configuration, among others.

Figure 5:
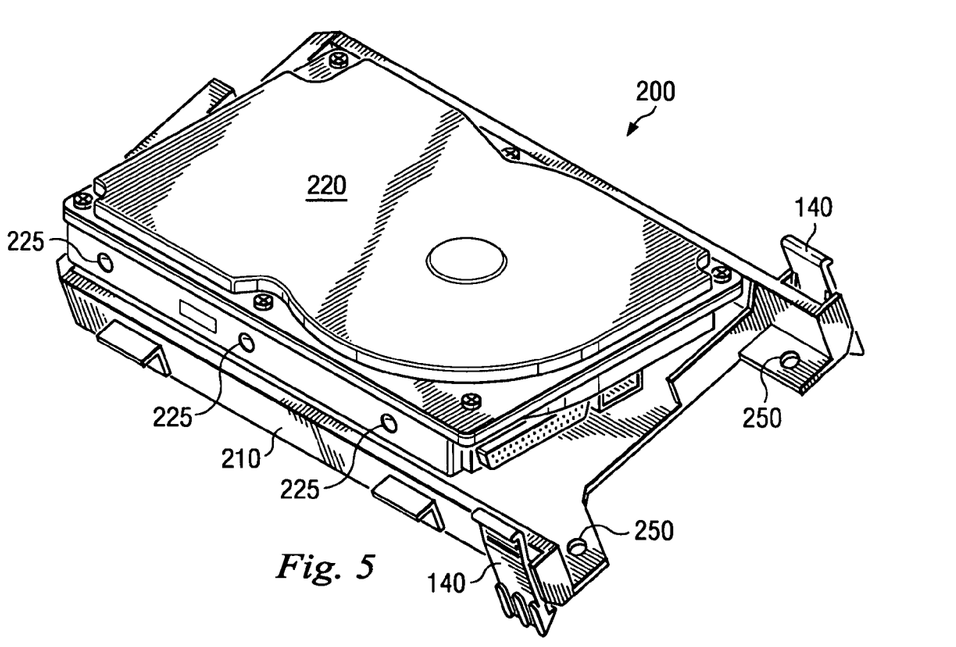
FIG. 5 is a perspective view of at least a portion of one embodiment of apparatus in an intermediate stage of assembly according to aspects of the present disclosure.

Referring to FIG. 5, illustrated is a perspective view of at least a portion of one embodiment of a sub-assembly 200 during an intermediate stage of assembly according to aspects of the present disclosure. The sub-assembly 200 includes a support structure 210 which is substantially similar to an embodiment of the apparatus 100 shown in FIG. 1. The sub-assembly 200 also includes a component 220 which is substantially similar to an embodiment of the component 102 shown in FIG. 2.

The component 220 may be a power supply module, a hard disk drive, an optical disk drive, or another mass storage device of an information handling system, among other possible components. In the illustrated embodiment, the component 220 is a hard disk drive, and includes several recesses 225 corresponding to spring detents or protrusions of the support structure 210. The component 220 may be secured to the support structure 210 by aligning the recesses 225 with the corresponding protrusions of the support structure 210 and subsequently urging the component 220 and support structure 210 together. As described above with respect to the apparatus 100 shown in FIG. 1, the walls of the support structure may be configured to aid in the alignment of the component 220 and support structure 210 and, consequently, the alignment of the protrusion/recess pairs that couple the component and the support structure 110.

Figure 6:
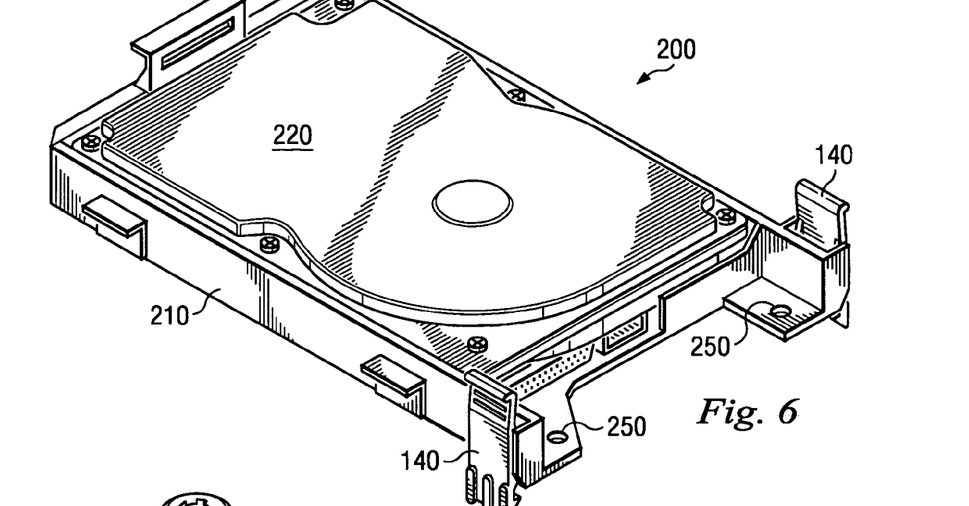
FIG. 6 is a perspective view of the apparatus shown in FIG. 5 in a subsequent stage of assembly according to aspects of the present disclosure.

Each protrusion/recess pair may be engaged substantially simultaneously, such as by maintaining substantially parallelism of the component 220 and the support structure 210 during assembly. In other embodiments, the protrusion/recess pairs may be engaged sequentially. For example, as in the intermediate stage depicted in FIG. 5, the protrusions on one side of the support structure 210 may be engaged with the corresponding recesses of the component 220 prior to engaging the remaining protrusion/recess pairs. FIG. 6 illustrates a perspective view of the apparatus 200 shown in FIG. 5 after completing the attachment of the component 220 to the support structure.

The scope of the present disclosure is not limited to the assembly process or apparatus described above with respect to FIGS. 5 and 6. For example, one or more of the protrusions of the support structure 210 described above may instead be features of the component 220, such that a corresponding number of recesses of the component 220 described above may instead be feature of the support structure 210.

Moreover, the assembly of the component 220 with the support structure 210 may be performed either before or after the support structure 210 has been secured within an information handing system (e.g., via coupling members 130 and/or 140, as described above). Additionally, as evident from the aspects described above, the assembly and/or disassembly of the components 220 and support structure 210 may be performed without requiring any hand-operated or machine-operate tools. That is, the component 220 may be assembled to the support structure 210 by hand, and/or may be disassembled from the support structure 210 by hand.

The embodiment shown in FIGS. 5 and 6 also depict alignment features 250 which may aid in the alignment of the support structure 210 during assembly. The supported structure 210 may include one or more of the alignment features 250, each of which may be a recess or opening configured to receive a corresponding protrusion or other alignment feature of structure to which the support structure 210 is to be coupled (such as the exemplary alignment features described below). However, in another embodiment, one or more of the alignment features 250 of the support structure 210 may be a protrusion configured to be received by a recess or other feature of the mating structure.

Figure 7:
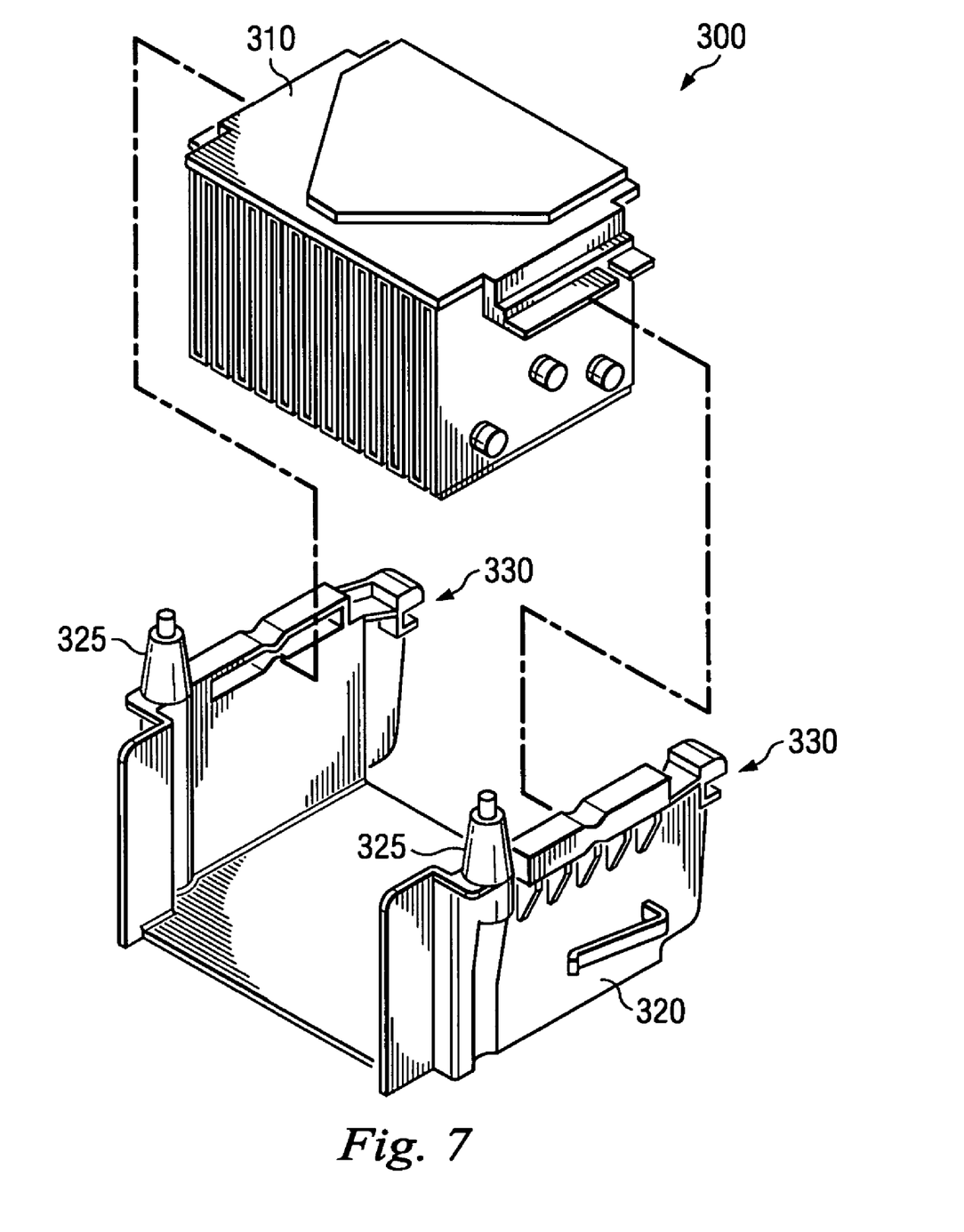
FIG. 7 is a perspective view of at least a portion of one embodiment of apparatus in an intermediate stage of assembly according to aspects of the present disclosure.

Referring to FIG. 7, illustrated is an exploded perspective view of at least a portion of one embodiment of an apparatus 300 according to aspects of the present disclosure. The apparatus 300 includes a central processing unit (CPU) heatsink shroud 310 and retainer module 320. The heatsink shroud 310 and retainer module 320 are couplable to form a heatsink subassembly, and the apparatus 300 may partially or substantially comprise the heatsink subassembly. Consequently, the apparatus 300 may generally be referred to as the heatsink subassembly 300, although the scope of the present disclosure is not limited to such an embodiment, as some embodiments of the apparatus 300 may include features and/or components in addition to the heatsink subassembly.

The retainer module 320 includes means 325 for securing the heatsink subassembly 300 to an information handling system chassis and/or otherwise within an information handling system. For example, the means 325 may be or comprise threaded fasteners, clips, latches, rivets, and/or other attachment components. The means 325 may couple the heatsink subassembly 300 to a structural member of the information handling system chassis, and/or to a motherboard or other printed wiring assembly (PWA) of the information handling system.

The retainer module 320 may also include at least one interface 330 corresponding to a support member described below. In one embodiment, each interface 330 comprises a clip, latch, channel, groove, recess, or other fastening feature configured to engage the support member. For example, the fastening feature may include a pair of biasable jaws configured to receive an retain an elongated attachment feature of the support member. In one embodiment, the jaws are elastic, configured to expand or otherwise deflect in response to contact with the support member attachment feature, and to thereafter contract around a portion of the attachment feature to retain the support member.

At least a portion of the inner profile of the fastening feature may substantially conform or otherwise correspond to at least a portion of the outer profile of the attachment feature. For example, the inner profile of the fastening feature and the outer profile of the support member attachment feature may each be substantially cylindrical and be substantially similar in diameter. However, the inner and outer profiles may also or alternatively be shaped to prevent rotation of the support member relative to the fastening feature. For example, the inner and outer profiles may each have substantially non-cylindrical configurations. Alternatively, the inner profile of the fastening feature may include a recess configured to receive a tab or protrusion of the attachment feature outer profile (or vice versa). In other embodiments, the fastening feature may be configured to receive the attachment feature while also permitting rotation of the attachment feature.

Figure 8:
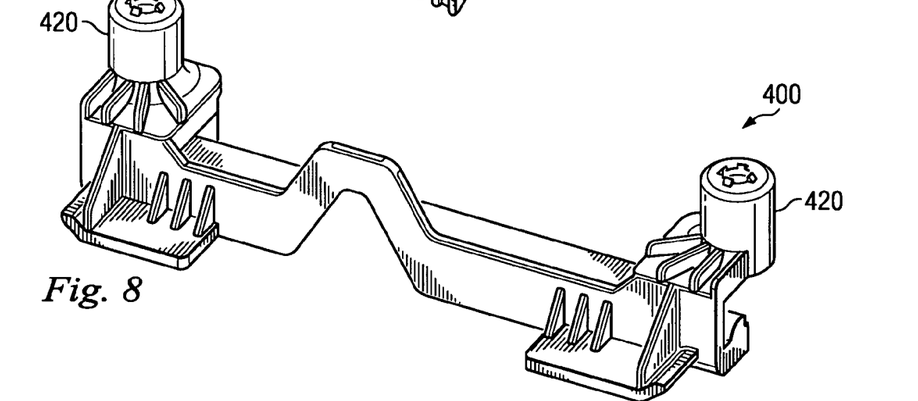
FIG. 8 is a perspective view of at least a portion of one embodiment of apparatus according to aspects of the present disclosure.
Figure 9:
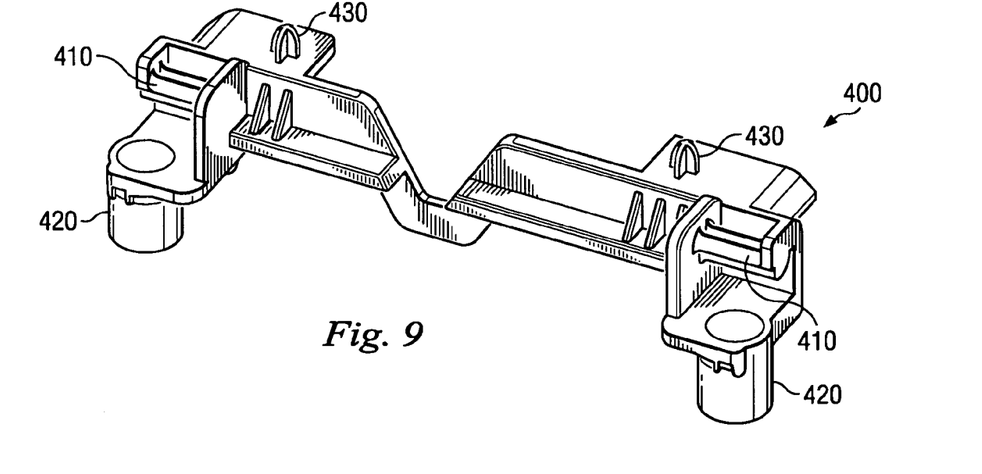
FIG. 9 is another perspective view of the apparatus shown in FIG. 8.

Referring to FIGS. 8 and 9, collectively, illustrated are perspective views of at least a portion of one embodiment of the support member described above, herein designated by reference numeral 400. The support member 400 includes two attachment features 410 configured to be engaged by the fastening features of the heatsink subassembly 300, as described above. The support member 400 also includes two stand-offs 420 configured to rest against a portion of an information handling system chassis, PWA and/or other portion of an information handling system, such as to support a component at a distance from the chassis, PWA and/or other portion of the information handling system. The stand-offs 420 may be or comprise a pliable or resilient material, such as to provide shock absorption for the component supported thereby. The stand-off 420 may also be or comprise a dielectric material, such as to electrically isolate the component supported thereby.

The support member 400 may also include at least one alignment member 430, which may have a tapered shape, such as may substantially resemble a cone, pyramid, or a portion of a sphere or ellipsoid, among other shapes. For example, the alignment member 430 may have a shape by which every plane section is parabolic. As in the illustrated embodiment, the alignment member 430 may also comprise a plurality of intersecting flanges collectively having a tapered shape as described above. The one or more alignment members 430 of the support member 400 can be configured to interface with alignment features of a mating component, such as the alignment features 250 shown in FIGS. 5 and 6.

Figure 10:
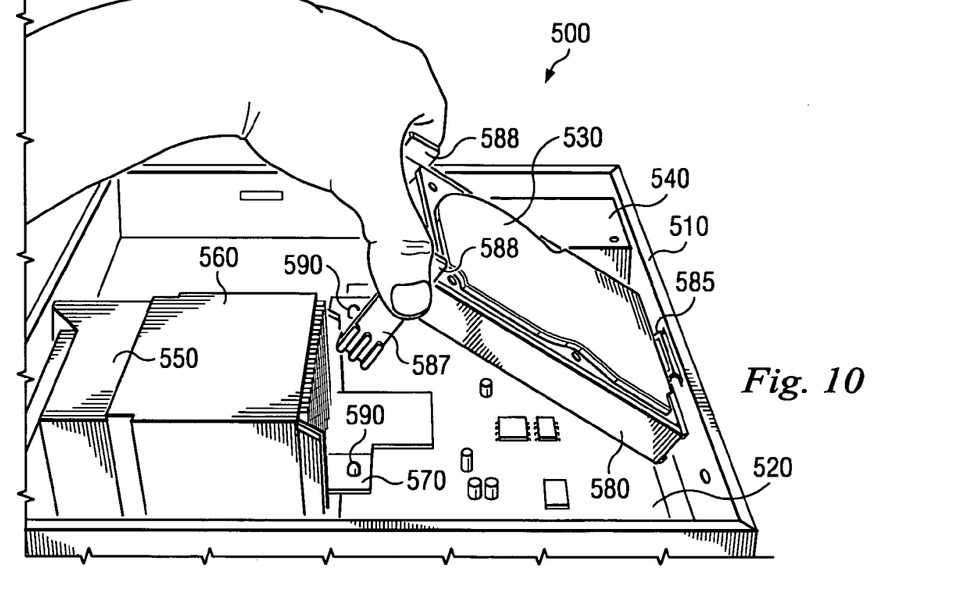
FIG. 10 is a perspective view of at least a portion of one embodiment of an information handling system in an intermediate stage of assembly according to aspects of the present disclosure.

Referring to FIG. 10, illustrated is a perspective view of at least a portion of one embodiment of an information handling system 500 in an intermediate stage of assembly according to aspects of the present disclosure. The system 500 includes a chassis 510 and at least one PWA (e.g., a motherboard) 520 coupled to the chassis 510, such as may conform to the Balanced Technology Extended (BTX) form factor.

In one embodiment, the PWA 520 includes a microprocessor connected to a bus, where the bus serves as a connection between the microprocessor and other components of system 500. An input device may be coupled to the microprocessor to provide input to the microprocessor. Examples of input devices include keyboards, touchscreens, and pointing devices such as mouses, trackballs and trackpads.

Programs and data are stored on a mass storage device 530. The mass storage device 530 may be a hard disk, optical disk, magneto-optical drive, floppy drive and the like. The system 500 may also include a display coupled to the microprocessor by a video controller. A system memory may be coupled to the microprocessor to provide the microprocessor with fast storage to facilitate execution of computer programs by microprocessor. It should be understood that other busses and intermediate circuits can be deployed between the above-described components and the microprocessor to facilitate interconnection between the components and the microprocessor.

The system 500 also includes a number of other components coupled to the chassis 510 and/or the PWA 520, such as the mass storage device 530, a power supply module 540, a thermal module 550 and a heatsink subassembly 560. The mass storage device 530 is secured within the system 500 by support structure 570 and 580.

The heatsink subassembly 560 is substantially similar to the heatsink subassembly 300 shown in FIG. 7, and support structure 570 is substantially similar to the support member 400 shown in FIGS. 8 and 9. Thus, for example, the support structure 570 includes attachment features configured to couple with the heatsink subassembly 560, possibly in a rotatable arrangement, as well as stand-offs resting on the PWA 520 and/or the chassis 510.

The support structure 580 is substantially similar to the apparatus 100 shown in FIG. 1, and is configured to receive the mass storage device 530 in the substantially the same manner as the apparatus 100 is configured to receive the component 102 shown in FIG. 1. The support structure 580 also includes a coupling member 585 that is substantially similar to the coupling member 130 shown in FIGS. 1-3. Thus, for example, the coupling member 585 is configured to attach the support structure 580 to the chassis 510. The support structure 580 also includes coupling members 587 that are substantially similar to the coupling members 140 shown in FIGS. 1 and 4. Thus, for example, the coupling members 587 are configured to attach the support structure 580 to the support structure 570. However, the coupling members 587 may be configured to attach the support structure 580 to other or additional components of the system 500 in other embodiments. For example, in one embodiment, a unitary support structure resembling aspects of the support structures 570 and 580 may be employed to secure the mass storage device 530 within the system 500.

In the assembly stage depicted in FIG. 10, the support structure 580 and mass storage device 530 are tilted to engage the coupling member 585 with the chassis 510. As described above, some embodiments within the scope of the present disclosure allow the support structure 580 to be attached to the chassis 510 by hand and without the use of any tools, as well as without requiring the use of any threaded fasteners.

After coupling the support structure 580 and chassis 510 via the coupling member 585, the support structure 580 can be rotated towards a final orientation (e.g., towards the central portion of the chassis 510). Consequently, the alignment features 590 of the support structures 570 and 580 align the support structures 570 and 580. Thereafter, as the support structure 580 further rotates towards its final orientation, the coupling members 587 engage flanges or other features of the support structure 570. In one embodiment, the coupling members 587 may be actuated to facilitate the engagement of the coupling members 587 wand the support structure 570. For example, ends 588 of the coupling members 587 may be urged inwards (relative to the support structure 580), thereby expanding opposite ends 588 of the coupling members 588 as they fit over the corresponding features of the support structure 570. Moreover, as described above, some embodiments within the scope of the present disclosure allow the support structure 580 to be attached to the support structure 570 by hand and without the use of any tools, as well as without requiring the use of any threaded fasteners, including threaded fasteners that might otherwise couple to the PWA 520.

Figure 11:
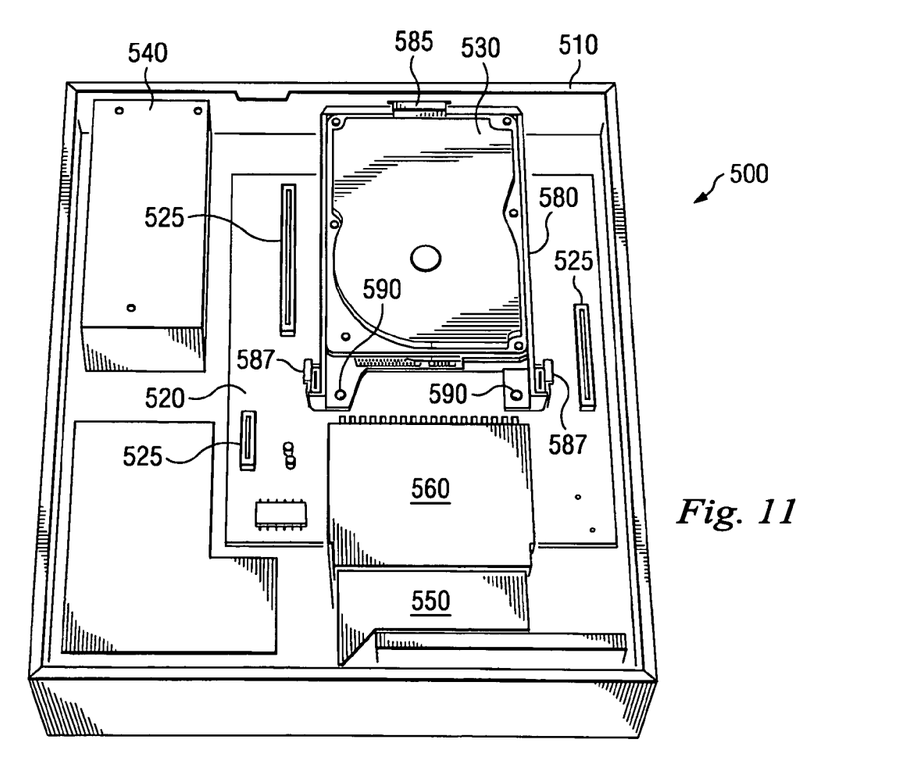
FIG. 11 is another perspective view the system shown in FIG. 10 in a subsequent stage of assembly according to aspects of the present disclosure.

Referring to FIG. 11, illustrated is a perspective view of the system 500 shown in FIG. 10 in a subsequent stage of assembly according to aspects of the present disclosure, depicting the completed assembly of the mass storage device 530 and the support structures 570 and 580, among other components. As shown in the FIG. 11, installation according to aspects of the present disclosure can permit access to components and connectors 525 of the PWA 520 without requiring removal of the mass storage device 530 or the support structures 570 and 580. Additionally, the mass storage device 530 can be aligned with the thermal module 550 and the heatsink subassembly 560 when installed according to aspects of the present disclosure. Consequently, air flow from the thermal module 550 may flow through the heatsink subassembly 560 to between the PWA 520 and the mass storage device 530.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An apparatus for securing a component to a chassis in an information handling system, the apparatus comprising:
a first interface configured to couple with the component;
a second interface configured to couple with the chassis;
wherein one of the first interface and the component comprises a first biasable member configured to engage a first engagement feature of the other of the first interface and the component; and
wherein one of the second interface and the chassis comprises a second biasable member configured to engage a second engagement feature of the other of the second interface and the chassis;
a first alignment feature configured to cooperate with a second alignment feature to align the component within the information handling system;
wherein one of the chassis, the component, and an additional component of the information handling system coupled to the chassis includes the second alignment feature; and
wherein one of the first and second alignment features is a protrusion configured to be received by a recess of the other of the first and second alignment features.

2. The apparatus of claim 1 wherein the first interface is configured to detachably couple with the component.

3. The apparatus of claim 1 wherein the second interface is configured to detachably couple with the chassis.

4. The apparatus of claim 1 wherein at least one of the first and second biasable members is configured for hand-operable engagement with the corresponding one of the first and second engagement features.

5. The apparatus of claim 1 wherein at least one of the first and second biasable members comprises a spring-loaded member.

6. The apparatus of claim 1 wherein one of the first interface and the component comprises a plurality of the first biasable members, and wherein at least one of the plurality of first biasable members is configured to engage the first engagement feature.

7. The apparatus of claim 1 wherein one of the second interface and the chassis comprises a plurality of the second biasable members, and wherein at least one of the plurality of second biasable members is configured to engage the second engagement feature.

8. An information handling system, comprising:
a chassis;
a heatsink assembly coupled to the chassis;
a mass storage device;

support structure coupled to the heatsink assembly and rotatably coupled to the chassis and configured to receive the mass storage device; the support structure including:
a first interface configured to couple with the mass storage device;
a second interface configured to couple with the chassis; and
a first alignment feature configured to cooperate with a second alignment feature to align the mass storage device within the information handling system;
wherein one of the chassis, the mass storage device, and the heat sink of the information handling system coupled to the chassis includes the second alignment feature; and
wherein one of the first and second alignment features is a protrusion configured to be received by a receiver of the other of the first and second alignment features.

9. The apparatus of claim 8 further comprising a thermal management assembly having a fan configured to direct air flow in a direction aligned with the heatsink assembly, wherein the support structure is configured to substantially align the mass storage device with the air flow direction.

10. The apparatus of claim 8 further comprising:
a circuit board coupled to the chassis by mechanical fasteners extending through the circuit board and into the chassis, such that the mass storage device and the circuit board are proximate opposing sides of the heatsink assembly and are substantially parallel.

11. The apparatus of claim 10 wherein the circuit board includes a plurality of electrical connectors located outside a projected footprint of the support structure and mass storage device.

12. The apparatus of claim 8 wherein the heatsink assembly includes a heatsink and a heatsink retainer coupled to the chassis, and the support structure includes a first member coupled to the heatsink retainer and a second member coupled the first member and the chassis, the second member being configured to receive the mass storage device.

13. The apparatus of claim 8 wherein the support structure is rotatably coupled to the chassis such that the support structure is rotatable relative to the chassis when the support structure is not coupled to the heatsink assembly.

14. The apparatus of claim 12 wherein the support structure is rotatably coupled to the chassis such that the support structure is rotatable relative to the chassis when the support structure is not coupled to the heatsink assembly.

15. An apparatus, comprising:
a support member for securing a component to a chassis section in an information handling system that substantially conforms to an industry standard form factor;
wherein a motherboard of the information handling system interposes the component and the chassis section; and
wherein the support member is configured to couple to the component and to the chassis without requiring any threaded fastener that couples to more than one of the component, the support member and the chassis section.

16. The apparatus of claim 15 wherein the component is one of a mass storage device and a power supply module, and wherein the support member is configured to couple to the component and to the chassis without requiring hand-operated tools.

* * * * *